(12) United States Patent
Rust (10) Patent No.: US 7,445,236 B2
(45) Date of Patent: Nov. 4, 2008

(54) VENTING CANISTER FOR AIRBAG SYSTEM

(75) Inventor: John C Rust, Rochester Hills, MI (US)

(73) Assignee: Chrysler LLC, Auburn Hills, MI (US)

( * ) Notice: Subject to any disclaimer, the term of this patent is extended or adjusted under 35 U.S.C. 154(b) by 258 days.

(21) Appl. No.: 11/244,030

(22) Filed: Oct. 5, 2005

(65) Prior Publication Data

US 2007/0075537 A1    Apr. 5, 2007

(51) Int. Cl.
*B60R 21/239* (2006.01)
*B60R 21/276* (2006.01)

(52) U.S. Cl. ........................ 280/739; 280/742
(58) Field of Classification Search ................ 280/739, 280/742, 743.2
See application file for complete search history.

(56) References Cited

U.S. PATENT DOCUMENTS

| | | | | |
|---|---|---|---|---|
| 6,113,134 A | * | 9/2000 | Lim | 280/730.1 |
| 6,371,517 B1 | * | 4/2002 | Webber et al. | 280/736 |
| 6,513,835 B2 | * | 2/2003 | Thomas | 280/743.2 |
| 6,918,613 B2 | * | 7/2005 | Short et al. | 280/736 |
| 2002/0117840 A1 | * | 8/2002 | Dunkle et al. | 280/743.2 |
| 2005/0040634 A1 | * | 2/2005 | Braun et al. | 280/742 |
| 2005/0248137 A1 | * | 11/2005 | Delventhal et al. | 280/739 |
| 2007/0170709 A1 | * | 7/2007 | Braun et al. | 280/739 |

* cited by examiner

*Primary Examiner*—Paul N. Dickson
*Assistant Examiner*—George D. Spisich
(74) *Attorney, Agent, or Firm*—Ralph E. Smith (57) ABSTRACT

An airbag canister vent is attached to or resides within an airbag module of an automobile. The module has a housing, within which resides a gas generator, an airbag, a tether cord, and a housing vent valve configured to close in accordance with the tether length that connects the airbag and the housing vent valve. The tension or any slack in the tether is governed by the discharge distance of the airbag from the canister. The canister vent may be a rotating disk that gradually closes as the airbag moves toward a seat occupant or a movable ball valve with a tether pin that remains open until the bag is discharged far enough from the canister to pull a tether pin from the ball causing the pressurized gas in the canister to forcibly lodge the ball against the vent hole wall thereby forming a seal and closing the valve.

8 Claims, 8 Drawing Sheets

VENTING CANISTER FOR AIRBAG SYSTEM

FIELD OF THE INVENTION

The present invention relates to an airbag system for a motor vehicle and more particularly to a mechanical vent in an airbag deployment canister.

BACKGROUND OF THE INVENTION

Inflatable interior automotive safety devices are known as supplemental restraint systems (SRS) and supplemental inflatable restraints (SIR), or more generically as "airbags." While current airbag systems have generally proven to be satisfactory for their applications, each is associated with its share of limitations. One limitation with current airbag systems is their venting systems. Because current airbag venting systems are located in the airbags themselves, current airbags are more complicated than they otherwise would be if the venting system were not located in the airbag. Additionally, when airbag venting systems are located in the airbag, the options for locating the venting systems are limited since the venting system location must take into consideration airbag deployment and passenger position relative to the deploying airbag. Furthermore, current airbag systems provide various stages of airbag inflation and cushioning to an impacting passenger by controlling the release of the fluid gas that fills the airbag. However, cushioning may be dependent upon the position of the passenger relative to the airbag.

What is needed is a device that does not suffer from the above limitations. This, in turn, will provide a device that eliminates the need to use airbag venting systems in the airbags. Furthermore, a device will be provided that permits varying amounts of fluid gas to fill the airbag depending upon its stage of deployment, taking into consideration the relative position of a passenger to the deploying airbag. Finally, a device will be provided that permits fluid gas to be immediately discharged from the airbag system upon airbag deployment in order to provide a desirable level of cushioning to a passenger impacting the airbag, relative to the position of the passenger impacting the airbag.

SUMMARY OF THE INVENTION

In accordance with the teachings of the present invention, an adjustable airbag canister vent is disclosed. A vehicle airbag having a tether resides within an airbag canister. An adjustable canister vent coupled to the tether activates in accordance with tension on the tether during airbag deployment to prevent gas from exiting the canister to fill the airbag at a faster rate.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

The present invention will become more fully understood from the detailed description and the accompanying drawings, wherein.

DETAILED DESCRIPTION OF THE PREFERRED EMBODIMENTS

The following description of the preferred embodiments is merely exemplary in nature and is in no way intended to limit the invention, its application, or uses.

Figure 1:
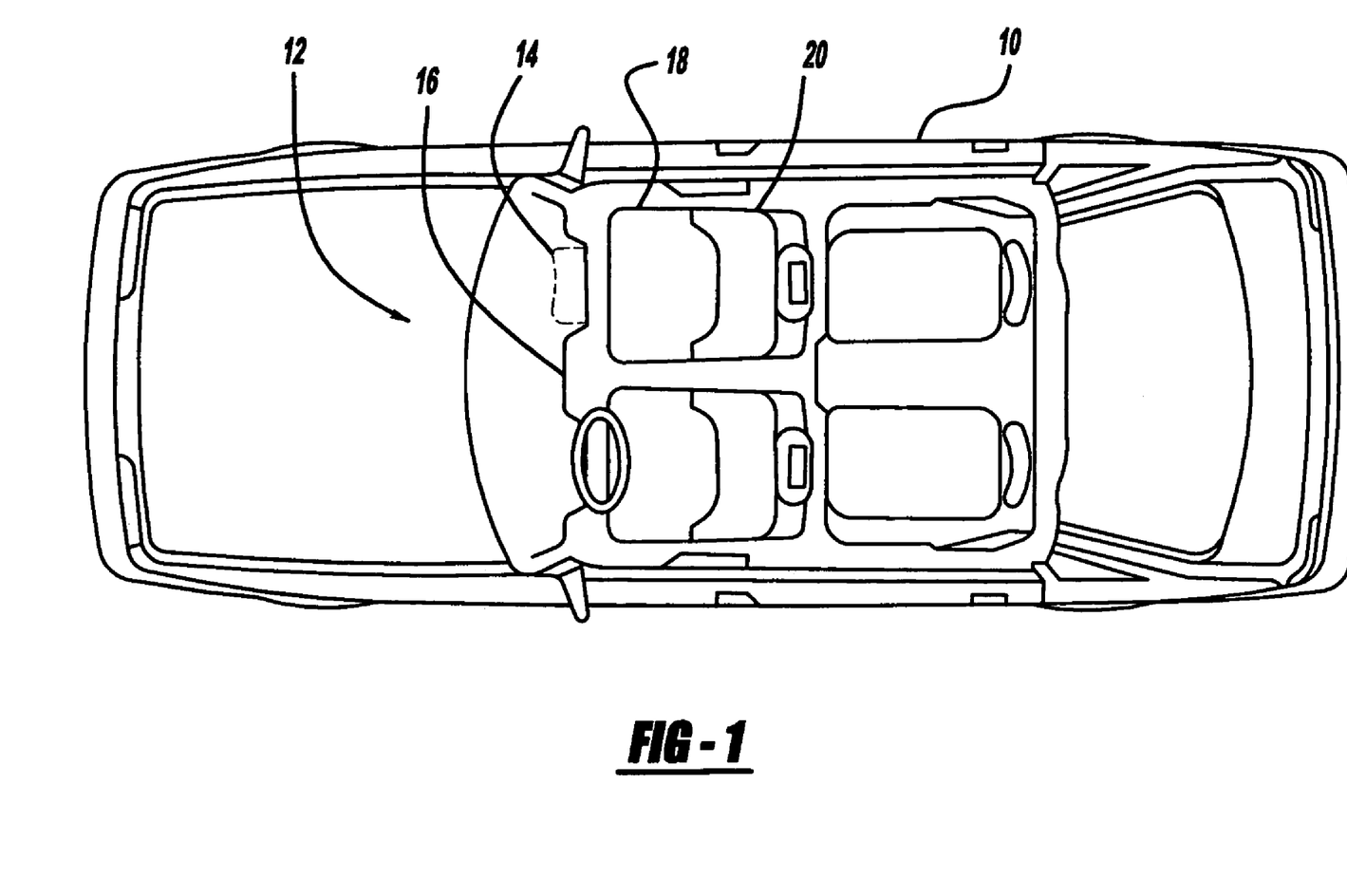
FIG. 1 is a top view of an automobile depicting the in-dash location of a front passenger supplemental restraint system relative to a vehicle front passenger seat according to the present invention.

Turning to FIG. 1, a vehicle 10 is depicted in which a passenger air bag system 14 of the present invention resides. Vehicular air bag systems are inflatable interior automotive safety devices and are also known as supplemental restraint systems (SRS), supplemental inflatable restraints (SIR), or more generically as "airbags," which will be used throughout this writing. The airbag system 14 of the present invention is shown imbedded or recessed within the dash 16 of the vehicle interior 12. While the location of the airbag system 14 is in the dash 16, and cannot move, the location of the passenger front seat bottom 18 and passenger front seat back 20 are mobile and play a role in the operative workings of the present invention. More specifically, it is the position of a passenger on the passenger front seat bottom 18 that governs the operation of the passenger airbag system 14 of the present invention.

Figure 2:
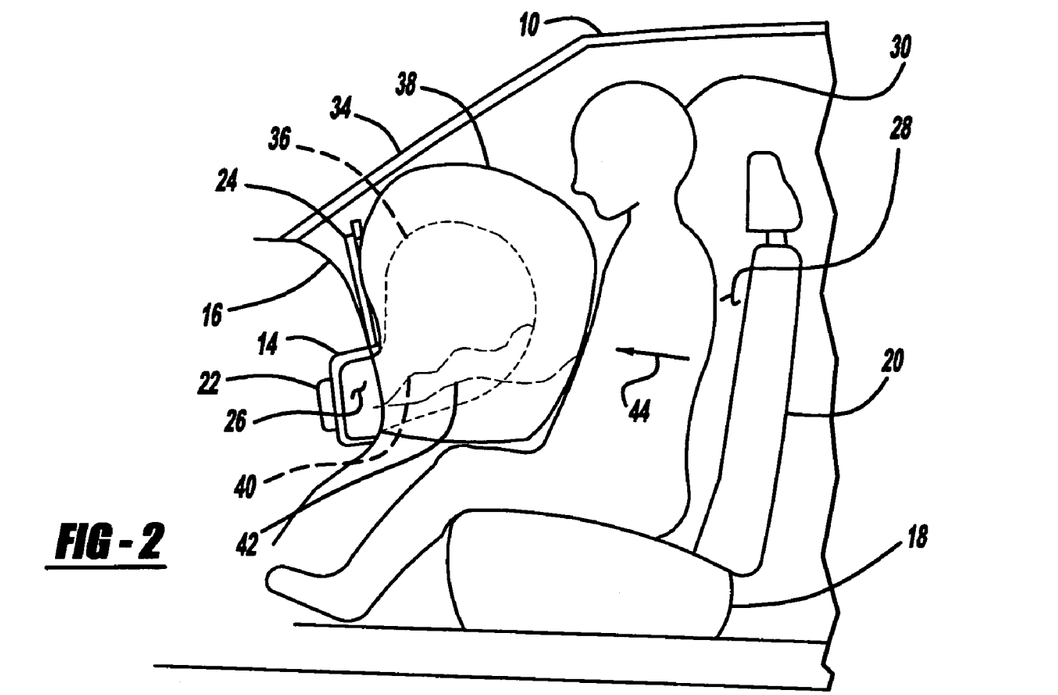
FIG. 2 is a side view of a discharging front supplemental restraint system with a front passenger sitting relatively close to the front dash area and the supplemental restraint system according to the present invention.

Turning now to FIGS. 2-8, a first embodiment of the present invention will be described. FIG. 2 depicts a vehicle occupant 30 in a more forward position, with a gap 28 between the occupant and the seat back 20, relative to the occupant 31 depicted in FIG. 3 who is embedded within the seat bottom 18 and seat back 20 in a more aft position. Additionally, in FIG. 3, the seat bottom 18 is adjusted farther away from the dash 16 as a user-selected option relative to the position of the seat bottom 18 in FIG. 2.

Continuing with FIG. 2 and FIGS. 4-8, the operative workings of the first embodiment will be described. During a front impact event of the vehicle 10, the occupant 30 will tend to move forward in the direction of arrow 44. When the vehicle 10 undergoes a front end impact, the airbag system 14 will discharge an airbag 64 from the airbag canister 15 residing in the dash 16 when an inflator 66, residing in an inflator recession 22 of the airbag canister 15, discharges a fluid gas from a plurality of inflator discharge holes 68 causing the opening of the airbag canister cover 24. The airbag 64 moves toward the occupant 30 and may be guided by the vehicle windshield 34 above the airbag. The airbag has a tether 40, a first end of which is attached to the airbag 64 and a second end of which is attached to a tether tab 84 of a rotary vent 70, which will now be described.

FIGS. 4 through 8 depict a rotary vent 70 in a side wall of the airbag canister 15. The rotary vent 70 has a mounting plate 72 and may have mounting holes 74 for attaching the rotary vent 70 to the airbag canister 15 with rivets, screws or other suitable fasteners. Alternatively, the rotary vent 70 may be welded to the wall of the airbag canister 15. The rotary vent 70 is shown adjacent to the non-inflated, folded airbag 64 in FIG. 4, with the inflator recession 22, which houses the inflator 66, positioned under the airbag 64.

Figure 4:
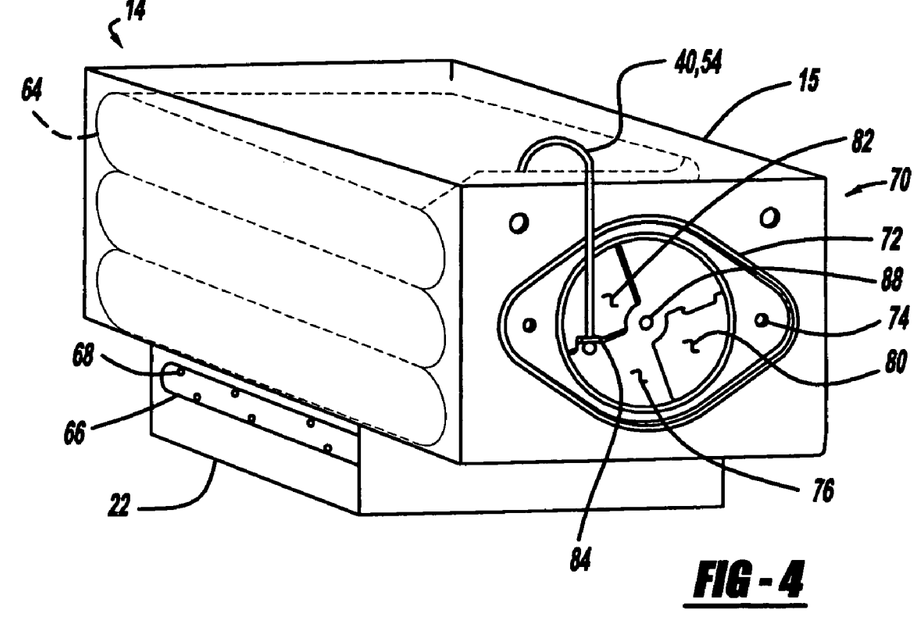
FIG. 4 is a perspective view of a supplemental restraint system canister depicting the location of a side discharge vent, in its open position, according to the present invention.

Referring to FIG. 2, when the vehicle 10 undergoes impact and the airbag 64 discharges and fills with fluid gas, the tether 40 begins to have its slack taken-up, although the tether 40 still has slack. When the airbag 64 is in intermediate airbag position 36, the rotary vent 70 is in its fully open position as indicated in FIG. 4. When the rotary vent 70 is open, fluid gas can escape from the airbag canister 15 interior to the airbag canister exterior. When the rotary vent 70 is open, gas is filling the airbag, but at the same time, gas is being vented through the open areas 80, 82 of the rotary vent 70. This provides the airbag with the proper inflation characteristics. As the airbag 64 inflates, it moves to airbag position 38, where the tether 42 still has an amount of slack.

Figure 6:
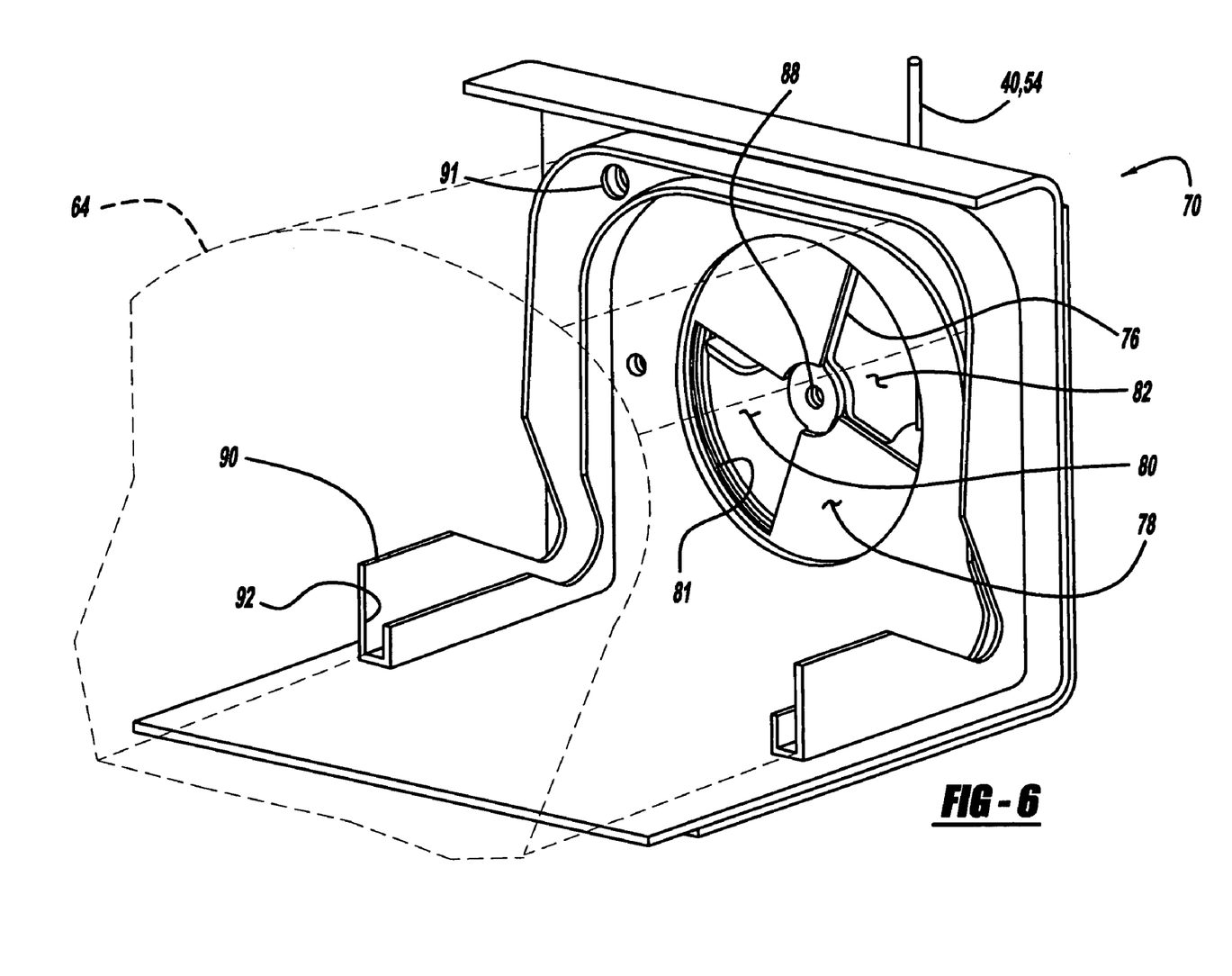
FIG. 6 is a perspective view from the interior of the supplemental restraint canister depicting the side rotary vent, the airbag, and the airbag retainer according to the present invention.

Before the conclusion of the discussion of the operative workings of the rotary vent 70, an explanation of how the airbag 64 is situated relative to the rotary vent 70 will be explained. Turning to FIG. 6, with the rotary valve 70 shown in its fully open position, an airbag retainer 90 having an airbag retainer groove 92 is shown. The airbag retainer 90 attaches to an interior side wall of the airbag canister 15 using the retainer hole 91 and any suitable fastener such as a screw or rivet. Alternatively, the airbag retainer 90 could be welded to the interior of the airbag canister 15. The airbag retainer 90 traverses around the opening 81 in the side wall through which fluid gas may discharge. The airbag 64, shown in phantom, is secured within the airbag retainer groove 92 in such a way that the interior of the airbag 64 can vent gas through the rotary vent 70. That is, when the airbag 64 is secured around the rotary vent 70, a fluid path exits from the inflator 66, through the airbag canister 15 and within the confines of the airbag 64, through the rotary vent 70 to the exterior of the airbag canister 15. More specifically, the fluid gas passes through the open areas 80, 82 when the rotating disk 76 is in a position to permit such a venting of gas.

FIG. 2 depicts a situation where the rotary vent 70 remains open and permits gas to escape from the airbag canister 15 while filling the airbag at the same time. As can be seen from FIG. 2, when the airbag 64 is at airbag position 36, there is slack in the tether 40. Likewise, when the airbag 64 is at airbag position 38, there is also slack in the tether 42 and the rotary vent 70 remains open. At the stage of deployment of airbag position 38 of the airbag 64, contact with the occupant 30 has been made, and the airbag 64 will not deploy any farther than airbag position 38. At airbag position 38, the airbag has completely discharged from the area 26 of the airbag canister 15 and cushioned the forward motion, indicated with arrow 44, of the occupant 30. The rotary vent 70, through its venting during deployment, provides the proper cushioning to the occupant 30. At no stage of deployment did the vent close for the scenario explained above and depicted in FIG. 2. The above description is a possible deployment scenario of the airbag when the occupant 30 is situated in a forward position on the seat bottom 18. More specifically, during the airbag deployment scenario of FIG. 2, the airbag tether does not become taught, which does not prompt closing of the rotary vent 70.

Figure 3:
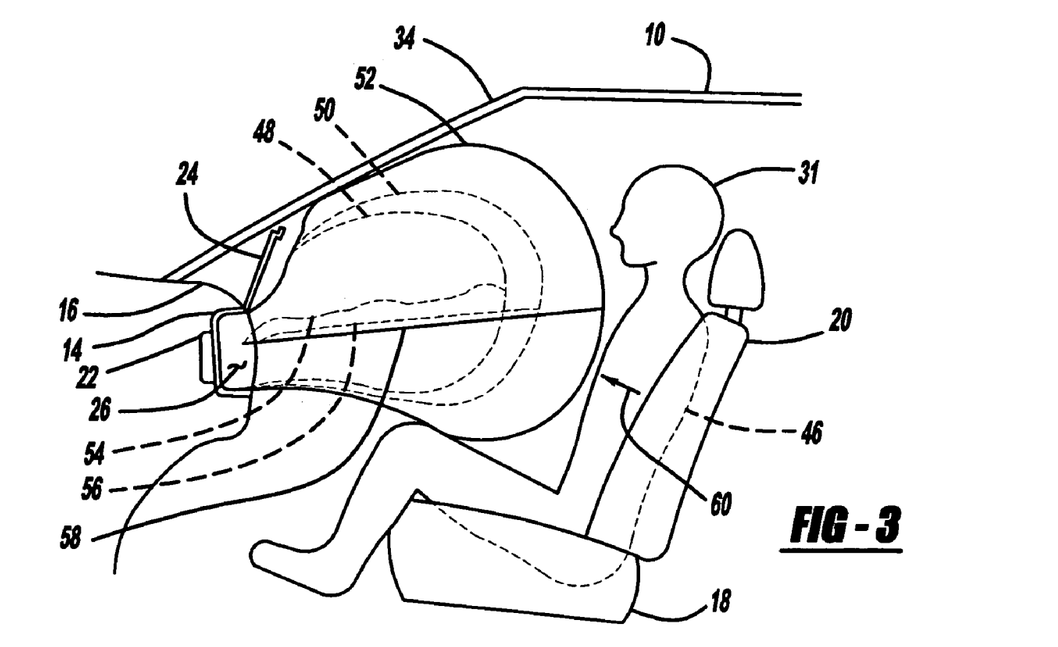
FIG. 3 is a side view of a discharging front supplemental restraint system with a front passenger sitting relatively far from the front dash area and the supplemental restraint system according to the present invention.

With reference to FIGS. 3-4 and FIGS. 6-8, a second deployment scenario will be described. FIG. 3 depicts a scenario in which the airbag 64 is permitted to completely deploy to airbag position 52. When the occupant 31 sits in an aft position in the seat bottom 18 and seat back 20, as depicted with the occupant back side 46, and for example, may have the seat bottom 18 adjusted far enough away from the dash 16 to require the airbag 64 to deploy to its farthest airbag position, such as airbag position 52, the following deployment scenario may occur. When a vehicle 10 experiences a front impact event, the airbag 64 of FIG. 4 will deploy to a first intermediate airbag position 48 (FIG. 3). At airbag position 48, the tether 54 has an amount of slack in it such that the rotary vent 70 of FIG. 4 remains in its fully open position. With reference to FIG. 6, when the rotary vent 70 is in its open position, in addition to filling the airbag 64, fluid gas from the inflator 66 is discharged from the plurality of discharge holes 68, through the airbag 64 residing in the airbag canister 15, and out through the opening 81 to outside of the canister 15.

Figure 7:
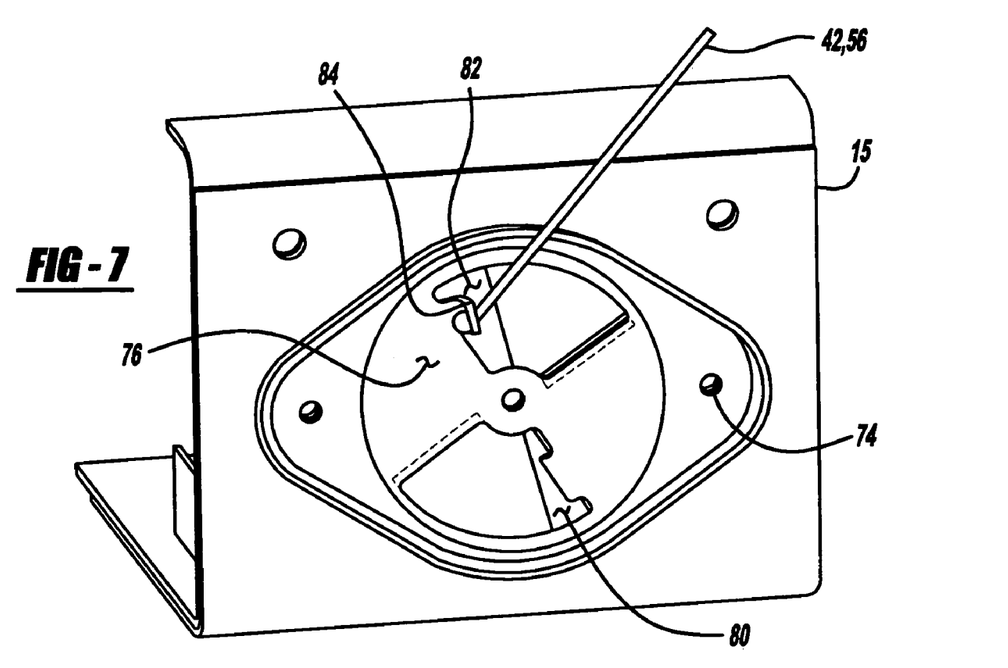
FIG. 7 is a side view of the side rotary vent in a partially open position according to the present invention.

Continuing with the airbag deployment and reference to FIG. 3, since the occupant 31 is far enough away from the deploying airbag 64 such that at airbag position 48, the airbag does not yet make contact with the occupant 31, the airbag 64 proceeds to fill with gas from the inflator 66 until the airbag 64 reaches airbag position 50. At airbag position 50, the tether 56 becomes taught, which causes the rotary vent 70 to begin closing as the airbag continues to fill and move towards the occupant. With reference to FIGS. 3 and 7, as soon as the airbag fills beyond airbag position 50, the tether 56 tension begins rotating the rotary disk 76 which begins the closing of the open areas 80, 82 (FIGS. 4 and 7). When the rotary vent 70 begins closing, less gas is permitted to escape from the airbag canister 15 which causes a proportionately greater amount of gas to flow into the airbag 50. As more gas flows into the airbag 50, the rotary disk 76 continues to rotate about point 88 which continues the closing of the open areas 80, 82, which causes an even larger amount of gas to flow into the airbag.

Figure 8:
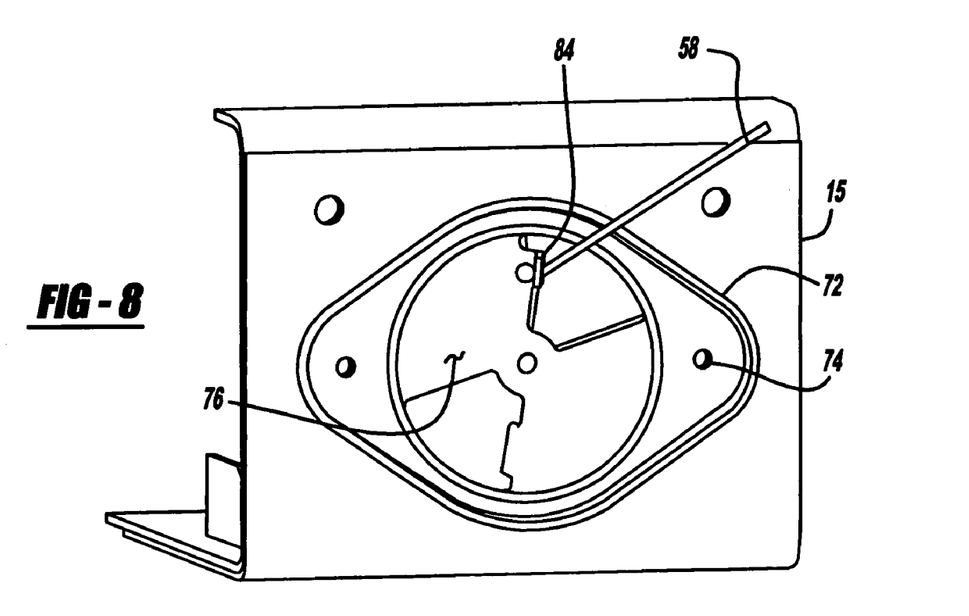
FIG. 8 is a side view of the side rotary vent in a fully closed position according to the present invention.

With continued reference to FIG. 3, since the airbag 64 at airbag position 50 has not yet made contact with the occupant 31, the airbag continues to fill and moves toward the occupant 31. Since the rotary disk 76 is rotating during this time, the rate of gas flowing into the airbag 64 continues to increase. When the airbag reaches airbag position 52, the state of the tether is as depicted by tether 58 (FIG. 8). Because the rotary disk 76 continues to rotate, the angle of the tether 58 in FIG. 8, is different from that of FIG. 7. At this position, with reference to FIG. 8, the rotary disk 76 of rotary vent 70 may be in a fully-closed position in which all of the gas being discharged from the inflator 66 is being directed into the airbag, which enables the airbag to continue its deployment toward the occupant 31 at a more rapid pace than at previous stages when the rotary vent 70 was open. When the rotary vent 70 is closed, the normally open, open areas 80, 82 are closed and non longer permit the passage of inflator gas. Upon closing of the rotary vent 70, it remains in a closed position and all of the inflator gas is used to fill the airbag at a more rapid pace than when the rotary vent 70 is open.

There are multiple advantages of using a rotary vent 70 of the present invention in the airbag canister 15. A first advantage is that when an occupant is sitting in accordance with FIG. 2, the open rotary vent 70 will permit gas to discharge out the rotary vent 70 open areas 80, 82 when the occupant 30 strikes the airbag, after the inflator 66 has stopped discharging gas. This provides a cushioned landing for the occupant. Even in the event the occupant is positioned particularly close to the dash 16 and the airbag discharges in a front end collision, when the occupant 30 makes contact with the airbag at airbag position 38, the gas will be directed out of the rotary vent 70 open areas 80, 82 because the occupant 30 will prevent the airbag from expanding, and thus the gas will seek an outlet through the open areas 80, 82.

There are also advantages of the rotary vent 70 in an occupant arrangement according to FIG. 3, in which the occupant 31 is sitting relatively far away from the dash 16. One advantage is that as the airbag continues to deploy but has not yet contacted the occupant 31 who is moving in accordance with direction arrow 60, a taught tether will cause the rotary vent 70 to close beginning at about airbag position 50 thereby directing all of the discharging gas from the inflator 66 into the airbag to cause the bag to reach the occupant 31 at a more rapid pace and eventually reach airbag position 52. This controlled expansion and venting feature permits the occupant 31 to take advantage of the protection offered by the airbag 52, even if the occupant is sitting relatively far from the dash 16. Of course, when the occupant 31 contacts the airbag at airbag position 52, the airbag will cushion the impact of the occupant 31.

An overall advantage of the rotary vent 70, regardless of whether the occupant is sitting relatively close to, or far from, the dash 16, is that sensors may not needed in the seat(s) that have traditionally determined various parameters such as occupant weight and relative seat position to determine if the airbag should be in an "on" or "off" mode. Because of this advantage, a broad range of passengers may be afforded cushioned airbag protection. Another advantage is the cost of the airbag system 14. Because the system is mechanical, and eliminates electronic sensors that may be costly to purchase, monitor and troubleshoot, there is a cost advantage to the airbag system.

Figure 5:
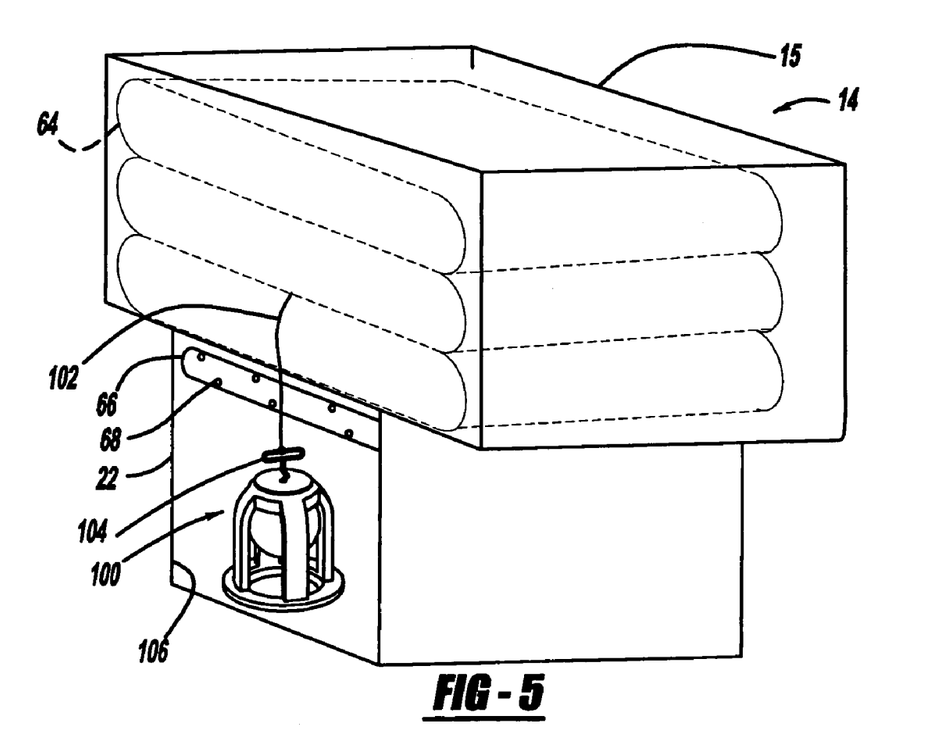
FIG. 5 is a perspective view of a supplemental restraint system canister depicting the location of a bottom discharge, ball vent valve according to the present invention.

Turning to a second embodiment of the invention, a ball valve style vent 100 is depicted in FIG. 5, and in FIGS. 9-14 as part of an airbag system 14. As depicted in FIG. 5, the ball vent 100 lies under the inflator 66, while the inflator 66 lies under the airbag 64. Alternate arrangements are possible and the arrangement of the ball vent 100 relative to the other parts of the airbag system 14 is not to be limited to that depicted in FIG. 5. Because the ball vent 100 operates in accordance with the discharging gas pressure, its functioning is not dependent upon gravity and provides options regarding its placement relative to the airbag 64 and the inflator 66.

Figure 9:
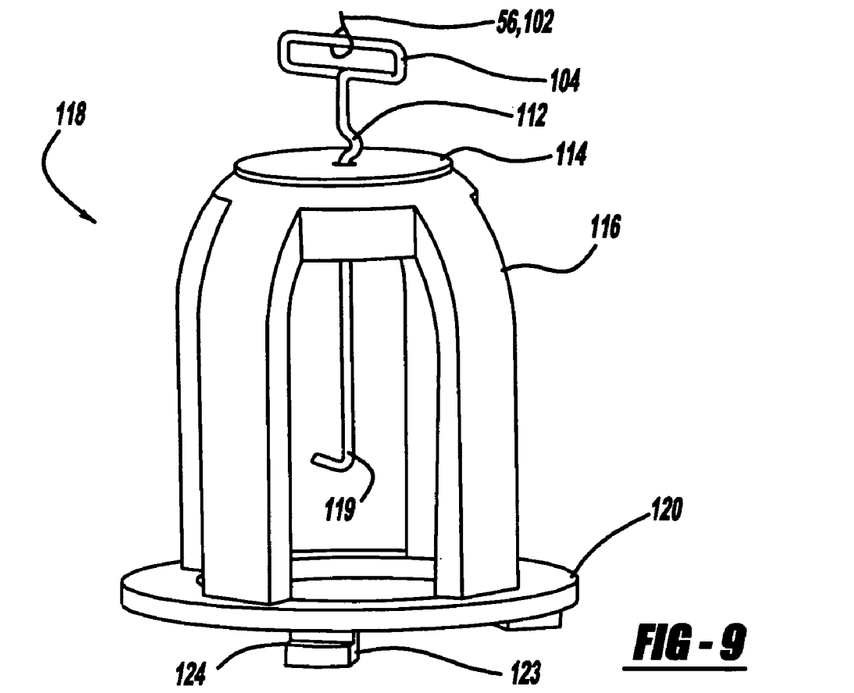
FIG. 9 is a perspective view of a ball vent valve depicting a ball retainer and a ball releasing pin according to the present invention.

Continuing with reference to FIG. 5, and FIGS. 9-14, the operative workings of the ball vent 100 will be explained. The ball vent 100 has a tether 102, one end of which is attached to the airbag 64 while the other end is attached to a tether pin 104. The tether pin 104 passes through a top plate 114 and is held in position by a tether pin stop 112 that is located between the top of the tether pin 104 and the top plate 114. The tether pin 114 passes through the center of a group of valve guide posts 116. While FIG. 9 depicts four valve guide posts 116, a varying number of valve guide posts are permissible, as long as the mobile valve element 122 (FIG. 11), also known as a ball 122, which is pierced by the tether pin 104, is held in position when in motion, which will be discussed later.

Figure 10:
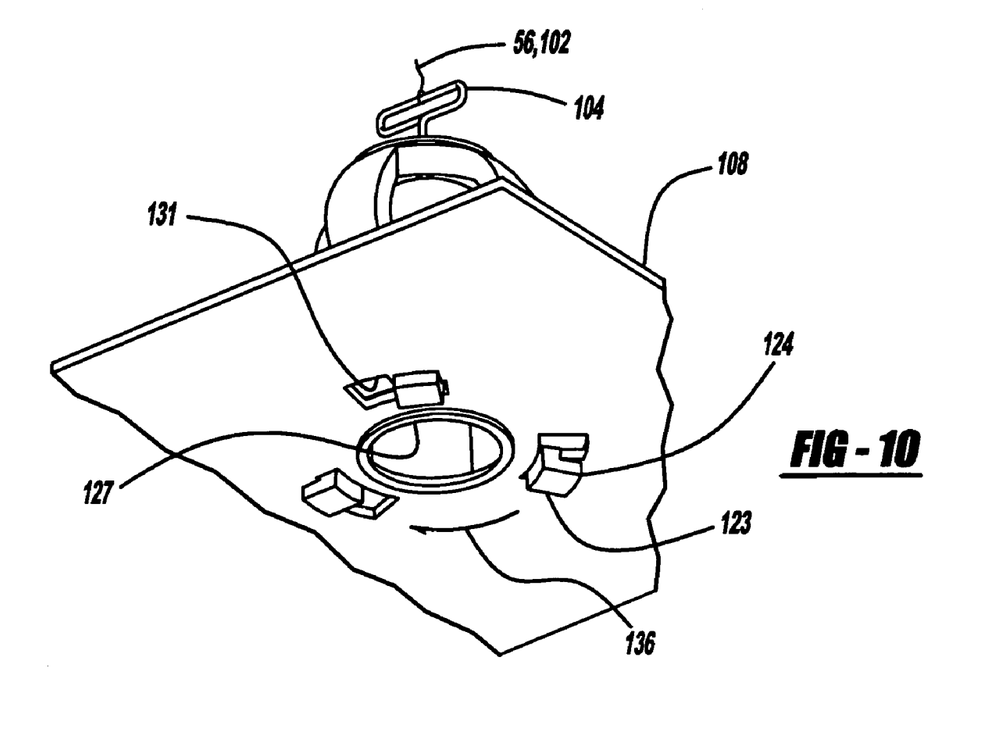
FIG. 10 is a bottom perspective view of a tab locking feature of the ball vent valve according to the present invention.
Figure 11:
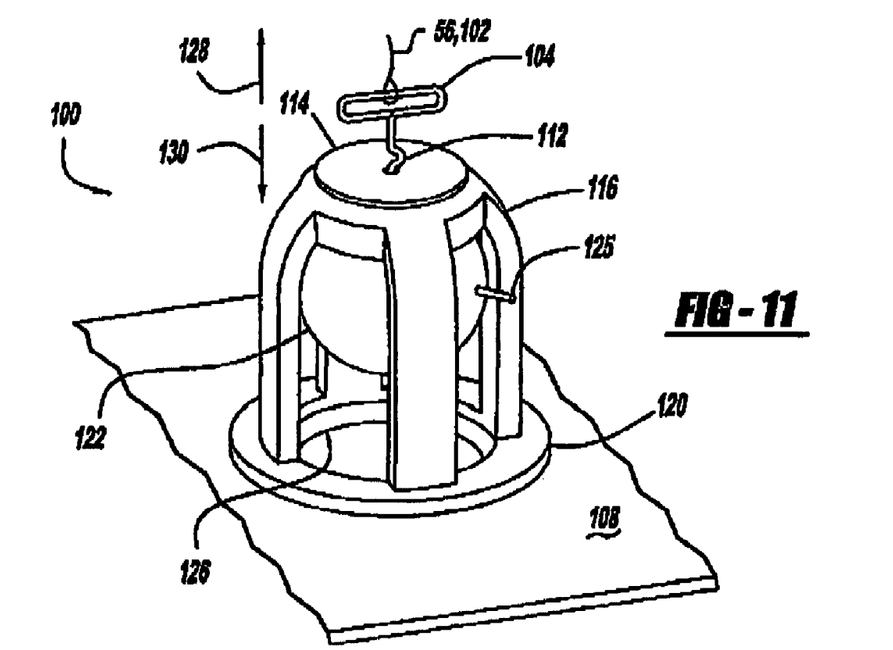
FIG. 11 is a perspective view of the ball vent valve in its open position depicting a tether pin and a ball pin according to the present invention.

Before discussing how the ball vent 100 functions as a vent of the air bag system 14, its attachment to the air bag canister 15 will be explained. The ball vent 100 attaches to the bottom surface of the airbag canister 15 from inside of the canister 15. The ball vent 100 has a locking post 123, which protrudes through the bottom of the mounting plate 120, and a locking tab 124 that protrudes from the locking post 123. To secure the ball vent 100 to the bottom wall 108 of the airbag canister 15, the locking post 123 is fitted through the mounting hole 131 and turned counterclockwise, when viewed from the tether pin 104, to lock the ball vent 100 to the bottom wall 108 in a wedge fit. From the discharge side, the ball vent is turned clockwise in accordance with arrow 136. The ball vent 100 can also be secured by fasteners such as screws, rivets, welding, etc.

Now, ball vent 100 functioning as a vent during the operation of the airbag system 14 will be discussed. With reference to FIG. 2, when a vehicle undergoes a front end collision, the airbag 64 will discharge to a first airbag position 36 in which the tether 40 has slack. As depicted in FIG. 2, the occupant 30 is sitting in a forward position on the seat bottom 18 and closer to the dash 16, relative to the occupant 31 of FIG. 3 who is sitting in a more relaxed position and farther from the dash 16. When the airbag 64 deploys, gas from the inflator 66 discharges through a group of inflator discharge holes 68 in the inflator 66. Since there is slack in the tether 40, while the fluid gas is filling the airbag 64 at airbag position 36, and causing the airbag to move toward the occupant, who is moving toward the airbag in accordance with the arrow 44, gas also is venting out of the airbag canister 15. With reference to FIGS. 10 and 11, inflator gas exits the canister 15 through the mounting plate hole 126 and the bottom wall hole 127.

With continued reference to FIG. 2, as the airbag continues to discharge to airbag position 38, the airbag makes contact with the occupant 30. At this stage of deployment, since the ball vent 100 is still in its open position, gas continues to vent outside of the canister 15 until the inflator 66 has finished discharging gas, and the cushioned impact of the occupant 30 with the airbag at airbag position 38 has concluded. Because the occupant 30 is positioned in a more forward position, as discussed above, the ball vent 100 never closes because the tether pin 104 remains intact and is not extracted from the ball 122. An advantage of this embodiment of the present invention is that the ball vent 100 remains open to vent gas outside of the canister 15 which provides cushioning to the impacting occupant 30 and an outlet for gas when the occupant impacts the airbag at airbag position 38. A situation in which the ball vent 100 closes will now be discussed.

With reference to FIGS. 3, 5 and 11-14 a situation in which the ball vent 100 closes will be described. When the vehicle 10 undergoes a front end impact with an object, the airbag 64 may deploy. In a situation in which the occupant 31 is sitting deep in the seat bottom 18 and seat back 20, and with the seat bottom 18 adjusted relatively far from the vehicle dash 16, the airbag 64 first deploys to an airbag position 48. At airbag position 48, there is still slack in the tether 54 and the inflator 66 is propelling fluid gas into the airbag and through the open ball vent 100. The open ball vent 100 permits gas to escape from inside the airbag canister 15 through the mounting plate hole 126 and through the bottom wall hole 127 of the canister 15. Next, because the airbag has not yet made contact with the occupant 31, the airbag continues inflating to airbag position 50. At airbag position 50, the tether is void of slack as indicated by tether 56. At airbag position 50, an additional feature of the present invention is invoked which will now be described.

With the slack eliminated in the airbag tether 56, the tether pin 104 of FIG. 11 will begin to receive tension from the taught tether 56. Still at this time, the inflator 66 is discharging gas into the airbag 64 such that the airbag continues to inflate and move toward the occupant 31. Additionally, gas is discharging, that is, "venting" exterior to the canister 15 via the holes 126, 127. As the airbag continues to inflate and move toward airbag position 52, the tension in direction 128 of the tether 56 increases such that the tether pin 104 is extracted from the mobile valve element 122. When the airbag is at airbag position 52, and the tether 58 has even greater tension in it than at tether 56, the tether pin 104 is in its extracted state and the ball 122 is forced according to arrow 121 to the position shown in FIG. 12. Although the size of the ball 122 will prevent it from passing through the mounting plate 120 and the bottom wall 108, the ball 122 may be equipped with a ball pin 125 to ensure that the ball stops at the surface of the mounting plate 120. Once the ball 122 moves in the direction of arrow 121, the ball 122 will not move in the opposite direction as indicated by direction arrow 128. Additional ball vent valve explanation follows.

The pin is extracted from the ball 122 by bending or breaking the hook 119 due to the force of the tension in the tether 58 (FIG. 3) caused by the filling airbag. The pressure inside the airbag canister 15, caused by the inflator 66, forces the ball 122 to travel within valve guide posts 116 of the valve guide 118 until the ball 122 stops and becomes lodged against the mounting plate 120. This stops the flow of gas through the mounting plate hole 126 and directs all discharging gas from the inflator 66 into the airbag such that the gas discharges at a faster rate.

As depicted in FIG. 3, the airbag is permitted to continue to inflate and move toward the occupant 31. However, since all of the gas from the inflator 66 is being directed into the airbag at airbag position 52, the airbag inflates at a more rapid pace to reach the occupant 31, who is sitting relatively far away from the vehicle dash 16. The advantage of the ball vent 100 is that when the ball 122 blocks the discharge of gas from the canister 15 through the mounting plate 120, the airbag 52 is able to fill faster, and as a result, the airbag 52 can travel toward the occupant at a faster rate. By filling in this manner, the airbag 52 is able to provide adequate cushioned protection to the occupant 31 who sits relatively far from the dash.

Figure 12:
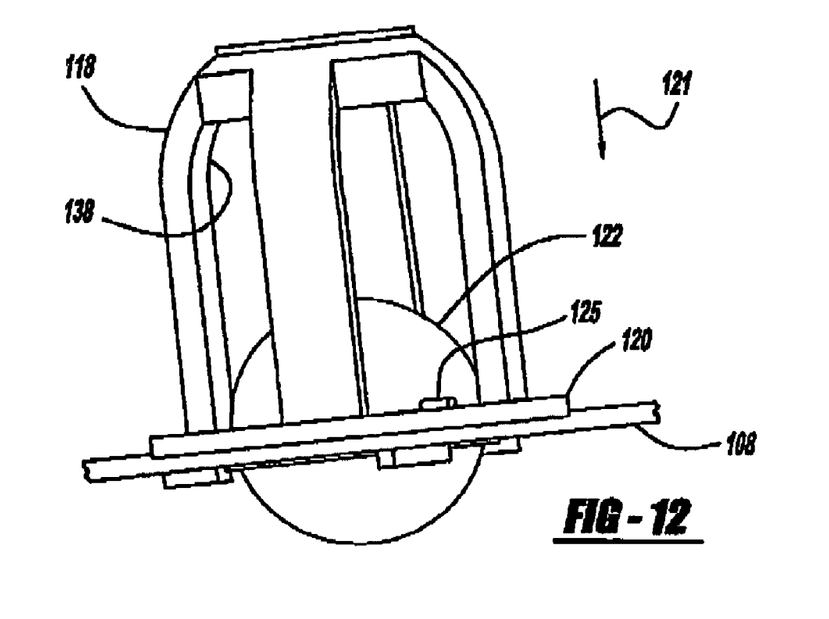
FIG. 12 is a side view of the ball vent valve in its closed position depicting a ball and a ball pin according to the present invention.
Figure 13:
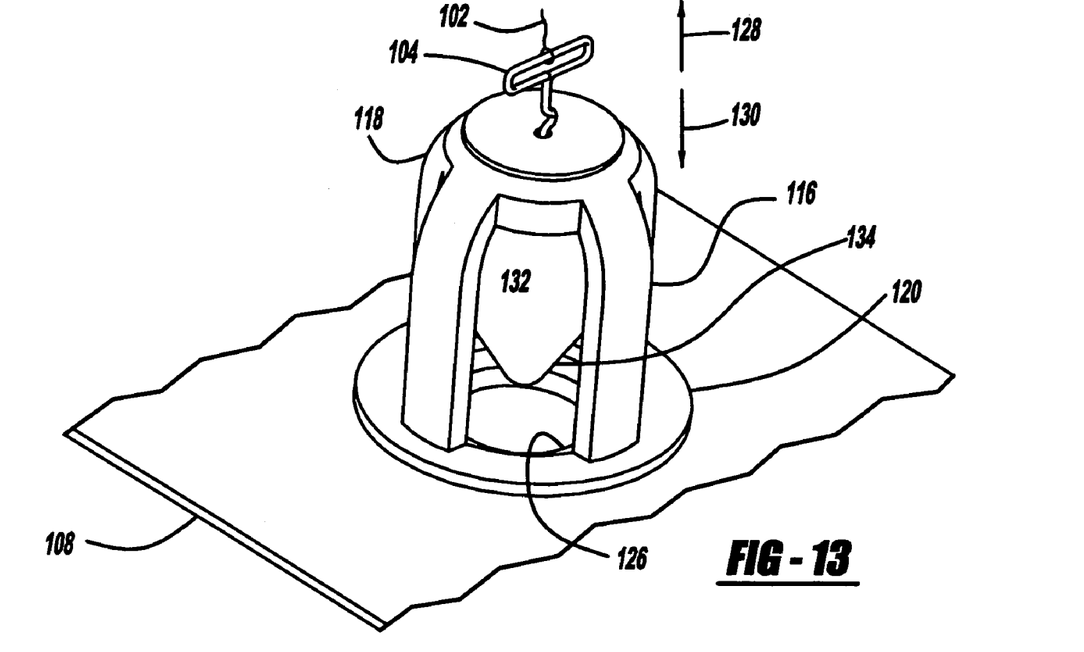
FIG. 13 is a top perspective view of an open ball vent valve depicting a retainer and a conical ball according to the present invention.
Figure 14:
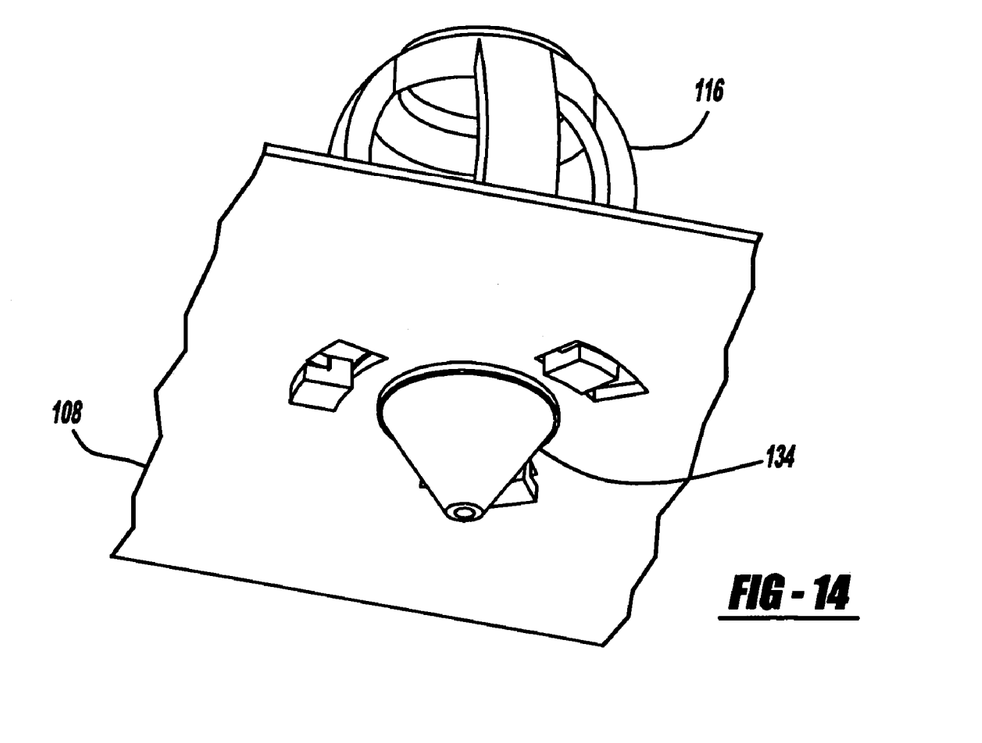
FIG. 14 is a bottom perspective view of a closed ball vent valve depicting a retainer and a conical ball according to the present invention.

While the ball vent 100 is depicted in FIGS. 10-12 as a sphere, the ball vent 100 may also employ a conical valve element 132 as depicted in FIG. 13. In such a case, the conical valve element 132 is forced in the direction indicated by the arrow 130, when the tether pin 104 is pulled by the tether 102 in the direction indicated by the arrow 128, which causes the conical valve element 132 to lodge in the mounting plate hole 126 and prevent gas from escaping though the mounting plate hole 126. Because of its elongated conical shape, an advantage of the conical valve element 132 is that it is able to stop the flow of gas through the mounting plate hole faster than a the ball 122 of FIG. 11 because the conical surface 134 of the conical valve element 132 begins its travel to the mounting plate hole 126 closer to the hole when the tether pin 104 is pulled.

The description of the invention is merely exemplary in nature and, thus, variations that do not depart from the gist of the invention are intended to be within the scope of the invention. Such variations are not to be regarded as a departure from the spirit and scope of the invention.

What is claimed is:

1. An airbag system for a vehicle comprising:
   a canister for housing an airbag, the canister defining a vent hole;
   a canister vent valve arranged over the vent hole; and
   a tether coupled between an airbag resident in the canister and the vent valve,
   wherein the canister vent valve is a ball valve comprising:
      a tether pin coupled to the tether and a mobile valve element,
      wherein the tether pin is withdrawable from the mobile valve element in accordance with tether tension.

2. The airbag system of claim 1 wherein the canister vent valve further comprises:
   a plurality of valve guides that confine the mobile valve element over the vent hole.

3. The airbag system of claim 1 further comprising:
   a gas generator, the gas generator located in the canister and urging the mobile valve element toward the vent hole, when the mobile valve element pin is withdrawn from the mobile valve element.

4. An airbag system for a vehicle comprising:
   a canister including a vent hole;
   an airbag disposed within the canister;
   a canister vent valve disposed over the vent hole; and
   a tether coupled to the airbag at a first end and coupled to the vent valve at a second end, the second end being selectively detachable from the vent valve,
   wherein the vent valve includes a valve element movable between en open position and a closed position, and
   wherein gas pressure within the canister urges the vent valve into the closed position when the tether is decoupled from the vent valve.

5. The airbag system of claim 4, wherein the mobile valve element engages the vent hole in the closed position to restrict fluid from passing through the vent hole.

6. The airbag system of claim 4, wherein the mobile valve element is a ball.

7. The airbag system of claim 4, wherein the mobile valve element is conical.

8. An airbag system for a vehicle comprising:
   a canister including a vent hole;
   an airbag disposed within the canister;
   a canister vent valve disposed over the vent hole; and
   a tether coupled to the airbag at a first end and coupled to the vent valve at a second end, the second end being selectively detachable from the vent valve,
   wherein the vent valve is a ball valve.

* * * * *